(12) United States Patent
De Lucia

(10) Patent No.: US 9,533,795 B2
(45) Date of Patent: Jan. 3, 2017

(54) CONTAINER FOR FOOD PRODUCTS AND METHOD FOR MANUFACTURING SUCH CONTAINER

(71) Applicant: Siropack Italia S.r.l., Cesenatico (IT)

(72) Inventor: Rocco De Lucia, Cesena (IT)

(73) Assignee: Siropack Italia S.r.l., Cesenatico (IL)

( * ) Notice: Subject to any disclaimer, the term of this patent is extended or adjusted under 35 U.S.C. 154(b) by 241 days.

(21) Appl. No.: 14/344,874

(22) PCT Filed: Sep. 19, 2012

(86) PCT No.: PCT/IB2012/054964
§ 371 (c)(1),
(2) Date: Mar. 13, 2014

(87) PCT Pub. No.: WO2013/042051
PCT Pub. Date: Mar. 28, 2013

(65) Prior Publication Data
US 2014/0299618 A1    Oct. 9, 2014

(30) Foreign Application Priority Data

Sep. 19, 2011 (IT) .............................. BO2011A0535

(51) Int. Cl.
*B32B 37/00* (2006.01)
*B65D 25/28* (2006.01)
(Continued)

(52) U.S. Cl.
CPC .......... *B65D 25/2844* (2013.01); *B29C 65/08* (2013.01); *B29C 65/601* (2013.01); *B29C 65/7838* (2013.01); *B29C 65/7841* (2013.01); *B29C 66/1122* (2013.01); *B29C 66/21* (2013.01); *B29C 66/304* (2013.01); *B29C 66/532* (2013.01); *B29C 66/61* (2013.01); *B29C 66/63* (2013.01); *B29C 66/712* (2013.01); *B29C 66/81429* (2013.01); *B29C 66/81463* (2013.01); *B29C 66/8322* (2013.01); *B29C 66/8432* (2013.01); *B65D 25/2867* (2013.01); *B29C 66/73921* (2013.01); *B29L 2031/463* (2013.01); *B29L 2031/713* (2013.01);
(Continued)

(58) Field of Classification Search
CPC ... B65D 25/2844; B29C 65/08; B29C 65/601; B29C 65/606; B29C 65/7838; B29C 65/7841; B29C 66/304; B29C 66/532; B29C 66/63
USPC ............... 156/73.1, 308.2, 579, 580.1, 580.2
See application file for complete search history.

(56) References Cited

U.S. PATENT DOCUMENTS

| | | | |
|---|---|---|---|
| 3,893,607 A | | 7/1975 | Jones |
| 4,647,325 A | * | 3/1987 | Bach ....................... B29C 65/08 156/290 |

(Continued)

FOREIGN PATENT DOCUMENTS

| | | |
|---|---|---|
| DE | 69 12 814 U | 7/1969 |
| DE | 38 44 483 C1 | 8/1989 |
| FR | 1397302 A | 3/1965 |

*Primary Examiner* — James Sells
(74) *Attorney, Agent, or Firm* — Blank Rome LLP

(57) ABSTRACT

A container for food products is defined by a cup-shaped basket, which is made of a first polymeric material, and is provided with a gripping handle connected to the basket in rotary manner by means of two coupling elements, which are made of a second polymeric material, and are welded to the basket itself.

6 Claims, 3 Drawing Sheets

(51) Int. Cl.
  *B29C 65/08* (2006.01)
  *B29C 65/60* (2006.01)
  *B29C 65/78* (2006.01)
  *B29C 65/00* (2006.01)
  B29L 31/00 (2006.01)
  B29L 31/46 (2006.01)

(52) U.S. Cl.
  CPC ........ *B29L 2031/737* (2013.01); *Y10T 156/10* (2015.01); *Y10T 156/1002* (2015.01); *Y10T 156/1056* (2015.01)

(56) References Cited

U.S. PATENT DOCUMENTS

| | | | | |
|---|---|---|---|---|
| 5,469,986 A | * | 11/1995 | Jang | ............ B65D 1/38 220/760 |
| 5,769,256 A | * | 6/1998 | Medal | ............ B29C 65/08 156/580.1 |
| 6,745,895 B2 | | 6/2004 | Silvers | |
| 2002/0179462 A1 | | 12/2002 | Silvers | |

* cited by examiner

CONTAINER FOR FOOD PRODUCTS AND METHOD FOR MANUFACTURING SUCH CONTAINER

TECHNICAL FIELD

The present invention relates to a container for food products.

BACKGROUND ART

In the field of the production of containers for food products, it is known to manufacture a container comprising a cup-shaped basket which is delimited by a bottom wall and a lateral wall, and is provided with a gripping handle coupled to the basket in a rotatory manner by means of two eyelets, which extend through the free ends of the handle, and are fixed to the basket by means of punching.

Since the basket and the handle are made of polymeric material and the eyelets are made of metal material, the containers for food products of the known type described above have several drawbacks, mainly deriving from the fact that the presence of a polymeric material and a metallic material involves the separate collection of the baskets and the handles on the one part and on the other part of the eyelets and therefore making operations for the disposal of such containers relatively complex and expensive.

DISCLOSURE OF INVENTION

It is an object of the present invention to provide a container for food products which is free from the above drawbacks and which is simple and economical to implement.

According to the present invention, there is provided a container for food products which is made entirely of polymeric material.

The present invention relates also to a method for manufacturing a container for food products.

According to the present invention, there is provided a method for manufacturing a container for food products as recited in the claims.

BRIEF DESCRIPTION OF THE DRAWINGS

The present invention will now be described with reference to the accompanying drawings, which illustrate a non-limiting embodiment, wherein.

BEST MODE FOR CARRYING OUT THE INVENTION

Figure 1:
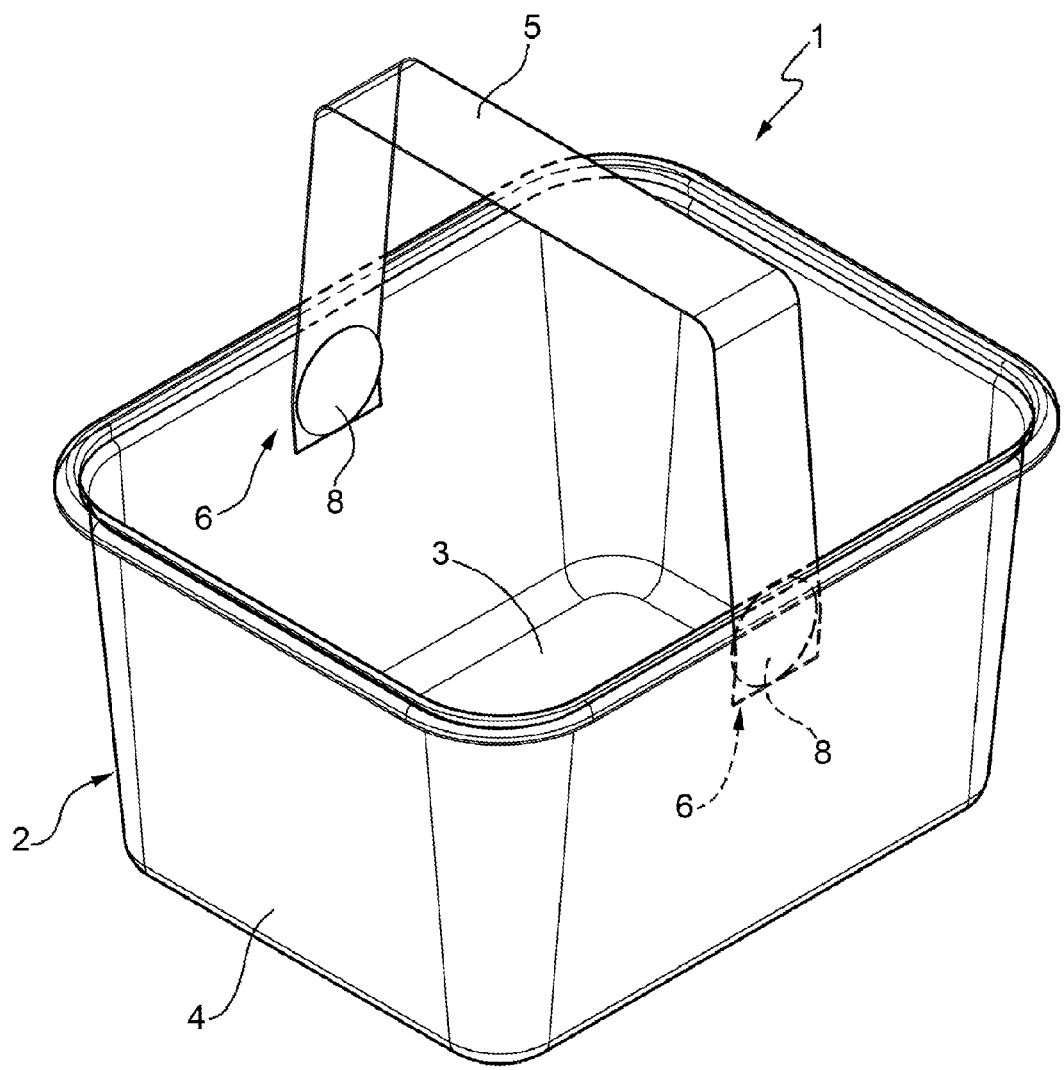
FIG. 1 is a perspective view of a preferred embodiment of the container for food products of the present invention.

With reference to FIG. 1, with 1 is indicated, as a whole, a container for food products, for example fruit and vegetable products, comprising a cup-shaped basket 2 which is delimited at the bottom by a bottom wall 3, and is limited, also, by a lateral wall 4 substantially transverse to the wall 3 itself.

The basket 2 is made of a polymeric material, and is provided with an elongated handle 5, which enables the gripping of the container 1, and is also made of a polymeric material identical to, or different from, the polymeric material of the basket 2.

Figure 2:
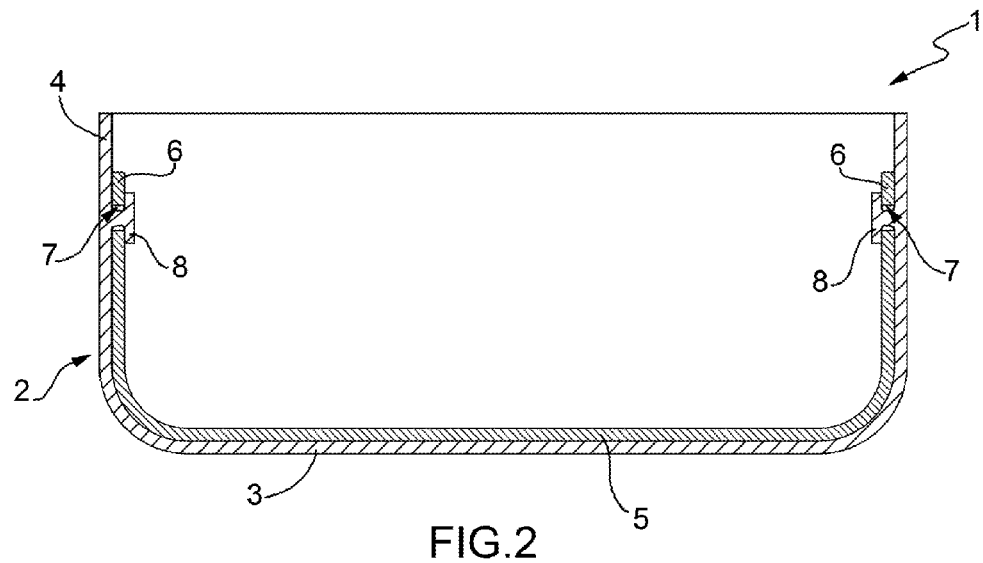
FIG. 2 is a schematic sectional view of the container of FIG. 1.

The handle 5 is substantially U-shaped, and comprises two free ends 6, which are folded inside the wall 4, are provided, each, with a respective hole 7 (FIGS. 2 and 3) obtained through the handle 5, and are connected to the wall 4 itself in a rotatable manner.

Each free end 6 is connected to the wall 4 by means of a coupling element 8, which presents, in this case, a substantially circular shape, is made of a polymeric material identical to, or different from, the polymeric material of the basket 2 and identical to, or different from, the polymeric material of the handle 5, and is welded to the wall 4 by means of welding, in this case an ultrasonic welding.

According to that mentioned above, it should be specified that the polymeric materials of the basket 2, the handle 5, and of the coupling elements 8 can be simple polymers or copolymers.

Figure 3:
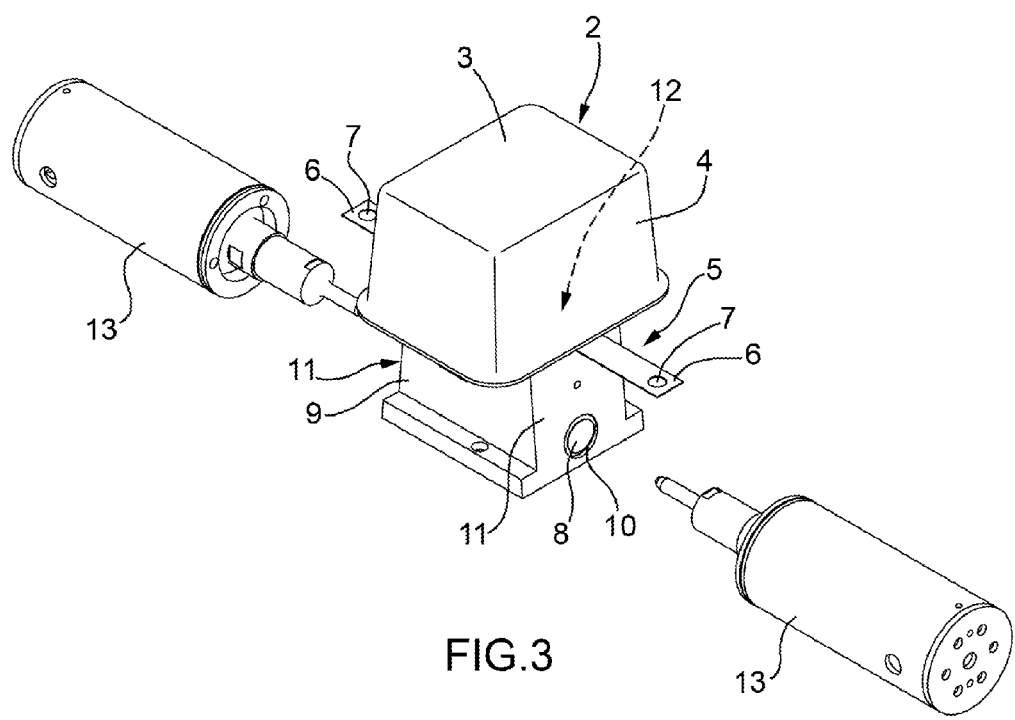
FIGS. 3 to 5 schematically show three successive steps of the production process of the container of FIGS. 1 and 2.
Figure 4:
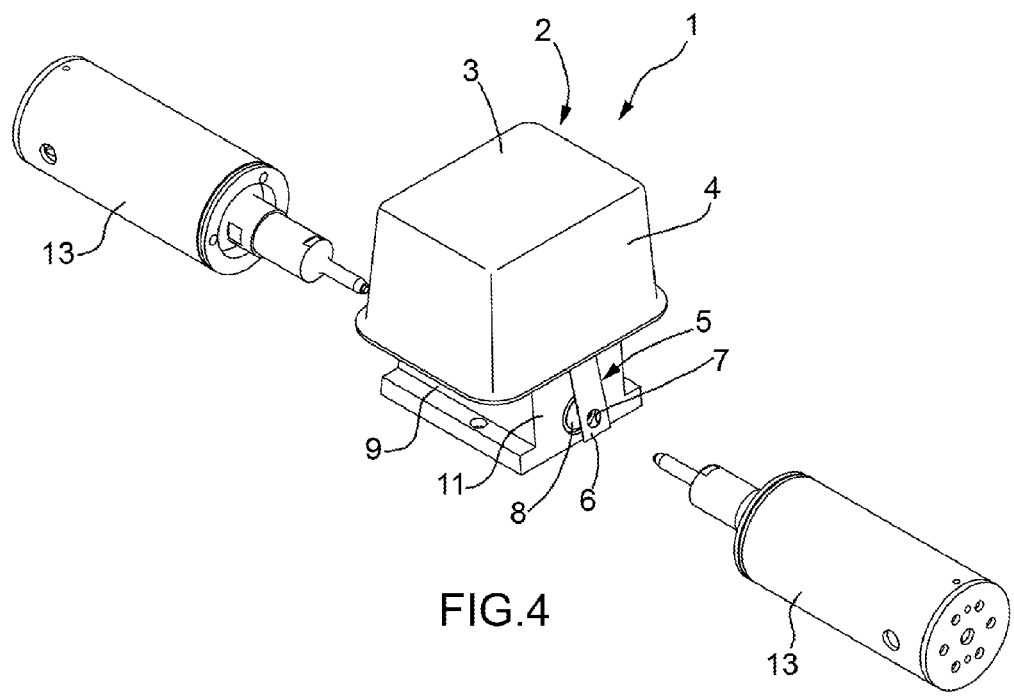
Figure 5:
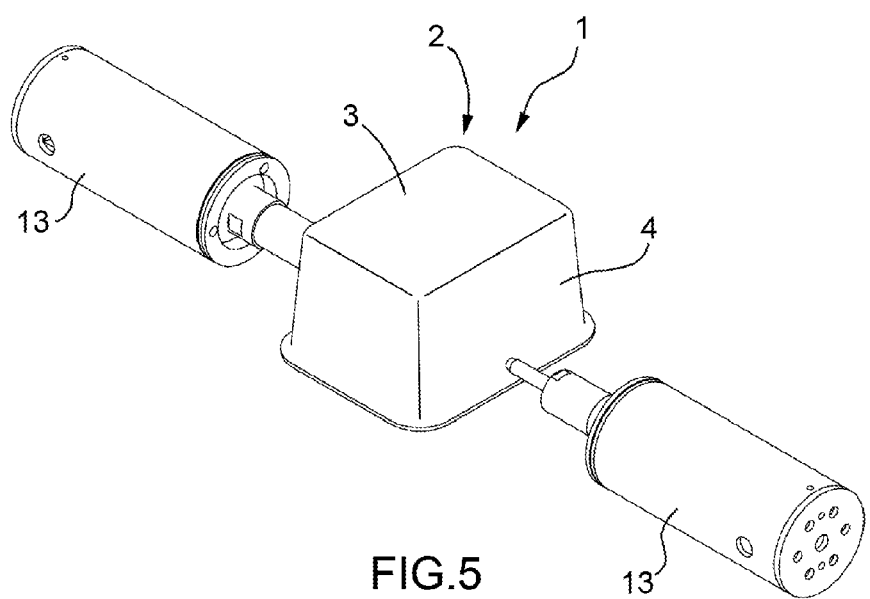

As illustrated in FIGS. 3 to 5, the container 1 is assembled into a die 9, which presents a substantially parallelepiped shape corresponding to the shape of the internal cavity of the basket 2, and presents two cavities 10 of substantially circular shape, which are obtained in correspondence with two lateral faces 11 of the die 9 opposite to each other, and are adapted to receive and retain, each, a respective element 8 (FIG. 3).

The die 9 has, furthermore, an upper face 12 adapted to receive and retain the handle 5 in its initial flat configuration, and cooperates with a lifting device (not shown) adapted for moving the basket 2 on the die 9 so as to fold into a U-shape the handle 5 on the die 9, above the elements 8, and inside the basket 2 itself (FIG. 4).

Once the basket 2 is moved on the die 9 and the handle 5 is folded between the basket 2 and the elements 8, each element 8 is welded to the wall 4 of the basket 2 by means of a respective ultrasonic welder 13 movable to and from an operative welding position, in which the welder 13 is substantially in contact with the basket 2.

Since the two welders 13 are shaped so as to weld each element 8 and the wall 4 inside the respective hole 7, the two welds substantially lead to the formation of two pin elements, which extend through the corresponding holes 7, and allow the handle 5 to rotate freely with respect to the basket 2.

Furthermore, since the container 1 is made entirely of polymeric material, the disposal operations of the entire container 1 are relatively simple and inexpensive and does not involve any separate collection of the different elements that constitute the container 1 itself.

The invention claimed is:

1. Method for manufacturing containers for food products, each container comprising a cup-shaped basket, which is delimited by a bottom wall and by a lateral wall, and is made of a first polymeric material, and a handle for holding the container; the method comprising the steps of:
coupling each free end of the handle to the basket in a rotatory manner by means of a relative coupling element, wherein each coupling element is made of a second polymeric material and is welded to the basket;
making a hole in correspondence to each free end of the handle; and
welding each coupling element to the basket inside the hole of the relative free end.

2. A method according to claim 1, wherein the coupling elements are welded to the lateral wall of the basket.

3. A method according to claim 1, wherein the coupling elements are connected to the basket by means of ultrasonic welding.

4. A method according to claim 1, wherein the coupling elements are welded to the basket with the free ends of the handle arranged between the basket and the coupling elements themselves.

5. Method for manufacturing containers for food products, each container comprising a cup-shaped basket, which is delimited by a bottom wall and by a lateral wall, and is made of a first polymeric material, and a handle for holding the container; the method comprising the steps of:
   coupling each free end of the handle to the basket in a rotatory manner by means of a relative coupling element, wherein each coupling element is made of a second polymeric material and is welded to the basket;
   arranging the coupling elements on a die; and
   moving the basket on the die interposing the handle, so as to bend the handle around the die, on the coupling elements, and inside the basket starting from an initial flat configuration.

6. A method according to claim 5 and comprising, furthermore, the steps of:
   making a hole in correspondence to each free end of the handle; and
   welding each coupling element to the basket inside the hole of the relative free end.

* * * * *